United States Patent Office 3,830,841
Patented Aug. 20, 1974

3,830,841
HERBICIDAL ANILIDES
Kenneth Wayne Ratts, Creve Coeur, Mo., assignor to Monsanto Company, St. Louis, Mo.
No Drawing. Filed June 1, 1971, Ser. No. 148,893
Int. Cl. C07c 103/44
U.S. Cl. 260—557 R          9 Claims

ABSTRACT OF THE DISCLOSURE

Herbicidal amidoalkyl-2-halo-substituted acetanilides.

---

This invention relates to novel amidoalkyl acetanilides which are useful as herbicides and to methods of preparing them. The invention also relates to herbicidal compounds and to methods of inhibiting or preventing the growth of plant systems.

The term "plants" is used herein to include germinant seeds, emerging seedlings and established vegetation, including the roots and above-ground portions.

The novel compounds of the present invention are represented by the formula

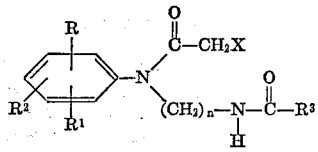

wherein:

$R$ and $R^1$ are hydrogen, alkyl or alkoxy having at least 1 and not more than 10 carbon atoms and can be like or unlike,
$R^2$ is hydrogen, alkyl or alkoxy having at least 1 and not more than 10 carbon atoms, $NO_2$ or halogen,
$R^3$ is hydrogen, alkyl, alkenyl, alkynyl, alkoxy, alkylthio, polyalkoxy, polyalkylthio, alkoxyalkyl, alkylthioalkyl, polyalkoxyalkyl, polyalkylthioalkyl, haloalkyl, hydroxyalkyl, mercaptoalkyl, haloalkenyl, oxoalkyl, alkenyloxyalkyl, alkenylthioalkyl, each of a maximum of 18 carbon atoms; cycloalkyl having at least 3 and a maximum of 6 carbon atoms; aryl, aryloxyalkyl, arylthioalkyl, trifluoromethyl- and haloaryl, trifluoromethyl and haloaryloxyalkyl, trifluoromethyl- and haloarylthioalkyl, arylalkyl, nitroaryl, nitroarylthioalkyl, and nitroarylalkyl having at least 6 and not more than 24 carbon atoms; amino or mono- and dialkylamino, monoarylamino, mono(haloaryl)amino, mono(trifluoromethylaryl)amino, and alkylalkoxyamino having a maximum of 10 carbon atoms,
X is chlorine, bromine or iodine, and
$n$ is an integer of 1 or 2.

Unless otherwise indicated, "allyl" and "alkoxy" are used generically to include primary, secondary, and tertiary alkyl groups.

Representative compounds of the present invention include those in which the groups of the above formula have the following identities:

$R$ and $R^1$—hydrogen, methyl, ethyl, propyl, isopropyl, n-butyl, primary isobutyl, secondary isobutyl, tertiary butyl, n-amyl, branch chain amyls, the normal and branched hexyls, heptyls, octyls, nonyls, and decyls, methoxy, ethoxy, propoxy, butoxy, pentyloxy, heptyloxy, nonyloxy.

$R^2$—hydrogen, chlorine, bromine, fluorine, iodine, nitro and the alkyl and alkoxy groups of $R$ and $R^1$.

$R^3$—hydrogen, methyl, ethyl, propyl, isopropyl, n-butyl, primary isobutyl, secondary, isobutyl, tertiary butyl, the normal and branched amyls, hexyls, heptyls, octyls, nonyls, decyls, dodecyls, tetradecyls, hexadecyls and octadecyls; chloromethly, bromopropyl, iodobutyl, fluorohexyl, hydroxyethyl, dihydroxypropyl; the alkoxy, alkenyl, oxoalkyl, alkoxyalkyl and alkynyl groups corresponding to the above-enumerated alkyl groups; phenyl, tolyl, naphthyl, phenoxy, benzyl, phenoxyalkyl; ethylene, trimethylene, tetramethylene; and the like.

The preferred compounds of the present invention are those in which both $R$ and $R^1$ are ethyl and more particularly the compounds in which they are in the ortho positions.

The novel compounds of the present invention in which $n$ is 1 are prepared by a carbonium ion type reaction of a 2-halo-N-(substituted methyl)acetanilide with a nitrile or an inorganic cyanide under acid conditions. The methyl substituent can be any group that is capable of forming a carbonium ion and is readily displaced under acidic conditions. Thus, the starting material can be a 2-halo-N-methyl acetanilide in which the methyl group is substituted with a halo, alkoxy, alkylthio, hydroxy, mercapto, alkenoyloxy and similar leaving groups. It is particularly preferred, however, to utilize a 2-halo-N-chloromethyl acetanilide in the preparation of these compounds. Mineral acids as well as Lewis acids can be employed to provide the acid medium but because of convenience and economics sulfuric acid is generally preferred for this purpose. A solvent can be used but in most instances is not generally required. While the reaction can be conducted at temperatures as low as 0° C., it is generally preferred to accelerate the reaction by conducting it under reflux conditions at the boiling point of the nitrile or solvent in the system. After the reaction is substantially completed the reaction mixture is quenched with water and filtered to recover the acetanilide which may then be purified in any conventional manner.

The 2-halo-N-(substituted methyl)acetanilide used as a starting material in this reaction is the adduct of a haloacetic derivative such as the halide or anhydride with a substituted azomethine or methylenearylamine of the type disclosed and claimed in copending application Ser. No. 625,020, filed Mar. 22, 1967, now abandoned. As more fully described in that application, the azomethines are prepared by the reaction of a suitably substituted aniline with formaldehyde. The 2-halo-N-halomethyl acetanilides that can be employed in preparing the present compounds are described and claimed in copending application, Ser. No. 855,030, filed Sept. 3, 1969, now U.S. Pat. No. 3,637,-847.

The compounds of the present invention can also be prepared by reacting a nitrile with an alpha halo-disubstituted-N-(alkoxymethyl)acetanilide of the type described and claimed in U.S. Pat. 3,442,945, granted May 6, 1969, to John F. Olin.

The novel compounds of the present invention in which $n$ is 2 are readily prepared by the chloroacetylation of an N-(substituted phenyl)-N' - acyl - ethylenediamine. The ethylenediamine derivatives used as starting materials for such reactions can be readily prepared in conventional manners by the alkylation of a substituted aniline with alkylating agents such as an N-(2-chloroethyl)-alkylamide, N-2-(hydroxyethyl)-alkylamide or an N-acyl aziridine.

The invention will be more clearly understood by reference to the following detailed description of specific examples thereof. In these examples and throughout the specification, all proportions are expressed in parts by weight unless otherwise indicated.

EXAMPLE 1

This example describes the preparation of 2-chloro-N-(2',6' - diethylphenyl)acetamidomethyl chloroacetate. About 168 parts of 2,6 - diethylphenyl of azomethine dissolved in benzene were slowly added to about 177 parts of chloroacetic anhydride dissolved in hot benzene. The reaction mixture was agitated until the reaction was substantially completed, concentrated and then chilled. A white solid melting at 57–58° C was obtained. An elemental analysis of this product yielded the following results:

Calc'd for $C_{15}H_{19}NCl_2O_3$: C, 54.27; H, 5.88. Found: C, 54.19; H, 5.91.

EXAMPLE 2

This example describes the preparation of 2-chloro-2',6'-diethyl-N-acetamidomethyl acetanilide. About 80 parts of 2-chloro-N-(2',6'-diethylphenyl)acetamidomethyl chloroacetate prepared in accordance with the general procedure of Example 1 was mixed with about 1000 parts of methyl cyanide and about 2 parts of 10% sulfuric acid in a suitable reaction vessel. The reaction mixture was refluxed for about 2½ hours at atmospheric pressure and then poured into a mixture of ice and water. The solid material thus obtained was recrystallized from methanol and melted at 148–149° C.

Calc'd for $C_{15}H_{21}ClN_2O_2$: C, 60.7; H, 7.13. Found: C, 60.68; H, 7.22.

EXAMPLE 3

This example describes the preparation of 2-chloro-2',6'-diethyl-N-(2',6'-dichlorobenzamidomethyl)acetanilide. About 100 parts of 2-chloro-N-chloromethyl 2',6'-diethyl acetanilide were added to about 350 parts of sulfuric acid in a suitable reaction vessel, cooled to about 0° C. and agitated. To this mixture was slowly added about 67 parts of 2,6-dichlorophenyl nitrile. After the addition of the nitrile was completed, the reaction mixture was heated to about 75° C. for about 1½ hours with constant stirring. The reaction mixture was then poured into ice water and a light tan solid precipitated. The solid was separated from the reaction mixture by filtration, washed with water, filtered and recrystallized from toluene to yield a material melting at 150.5–153° C.

Calc'd for $C_{20}H_{21}Cl_3N_2O_2$: C, 56.16; H, 4.95. Found: C, 55.69; H, 4.85.

EXAMPLE 4

This example describes the preparation of 2-chloro-2',6'-diethyl-N-allylamidomethyl acetanilide About 300 parts of sulfuric acid were charged into a suitable reaction vessel. About 100 parts of 2-chloro-N-chloromethyl 2',6'-diethyl acetanilide and about 26 parts of allyl nitrile, dissolved separately in glacial acetic acid, were added to the sulfuric acid. After these reactants were added, the reaction mixture was heated to about 55° C. for about 15 minutes and then poured into ice water. The resultant solid precipitate was filtered and washed with water. After recrystallization from isopropanol, the product had a melting point of 121.5–123.5° C.

Calc'd for $C_{17}H_{23}ClN_2O_2$: C, 63.25; H, 7.18. Found: C, 62.38; H, 6.95.

EXAMPLE 5

This example describes the preparation of 2-chloro-2',6'-diethyl-N-formamidomethyl acetanilide. About 200 parts of 2-chloro-N-chloromethyl 2',6'-diethyl acetanilide were added to 400 parts of concentrated sulfuric acid. The mixture was cooled to about 10° C. and 70 parts of sodium cyanide were then added and the reaction mixture heated to about 50° C. The reaction was exothermic and the temperature of the reaction mixture rose to about 85° C. The reaction mixture was cooled, poured into ice water, extracted with methylene dichloride, washed with water and dried over magnesium sulfate. The only residue formed was crystallized from ether and recrystallized with a methylcyclohexane-toluene mixture, m.p. 85–89° C.

Calc'd for $C_{14}H_{19}ClN_2O_2$: C, 59.46; H, 6.77. Found: C, 59.64; H, 6.69.

EXAMPLE 6

This example describes the preparation of 2-chloro-2',6'-diethyl - N - (3-chloro-2-methylpropionamidomethyl) acetanilide. About 100 parts of 2-chloro-N-chloromethyl 2',6'-diethyl acetanilide were mixed with 26 parts of methacrylonitrile and added to about 350 parts sulfuric acid at a temperature of about 10° C. in a suitable reaction vessel. The reaction mixture was heated to about 65° C. for about four hours while dry hydrogen chloride gas was bubbled through it. The reaction mixture was poured into ice water and filtered to remove the precipitate which was then recrystallized from isopropanol.

Calc'd for $C_{17}H_{24}Cl_2N_2O_2$: C, 56.83; H, 6.73. Found: C, 56.85; H, 6.62.

EXAMPLE 7

This example describes the preparation of 2-chloro-2',6'-diethyl-N-acrylamidomethyl acetanilide. About 135 parts of 2-chloro-2',6'-diethyl-N-methoxymethyl acetanilide were mixed with about 27 parts of acrylonitrile and about 300 parts of sulfuric acid were added. The reaction mixture was heated to about 55° C. and maintained at that temperature for about one hour. At the end of that time the reaction mixture was poured into ice water and yielded a solid granular precipitate. This material was removed from the reaction mixture by filtration, washed with water and recrystallized from isopropanol. The recrystallized material melted at 174–175° C.

Calc'd for $C_{16}H_{21}ClN_2O_2$: C, 62.23; H, 6.85. Found: C, 62.54; H, 7.05.

EXAMPLE 8

This example describes the preparation of 2-chloro-2'-ethyl-6'-methyl-N - (cyclopropane carboxamidomethyl) acetanilide. About 300 parts of concentrated sulfuric acid were charged into a suitable reaction vessel and cooled to about 0° C. while being agitated. About 100 parts of 2-chloro-2'-ethyl-6'-methyl-N-chloromethyl acetanilide were slowly added and the mixture heated to about 25° C. to expedite dissolution of the adduct. The mixture was again cooled to about 10° C. and about 28 parts of cyclopropyl nitrile were slowly added. After the addition of the nitrile was completed, the reaction mixture was heated to about 55° C. for about 20 minutes and then poured into ice water. This resulted in the formation of a gummy precipitate which solidified upon standing about 8 hours. The solid precipitate was separated by filtration, washed with water, filtered and recrystallized from isopropanol. This material melted at 154–156.5° C.

EXAMPLES 9 THROUGH 48

The following compounds are also prepared by substantial repetition of the general procedures set forth in the foregoing examples:

(9) 2-chloro-2',6'-diethyl-N-(cinnamamidomethyl) acetanilide

(10) 2-chloro-2',6'-diisopropyl-N-(butyramidomethyl) acetanilide

(11) 2-bromo-2',3',6'-trimethyl-N-(acetamidomethyl) acetanilide

(12) 2-iodo-2',6'-diethyl-4'-methyl-N-(chloroacetamidomethyl)acetanilide

(13) 2-chloro-2',6'-diethyl-N-(3-ethoxypropionamidomethyl)acetanilide

(14) 2-chloro-2',6'-diethyl-N-(2-chloroacetamidomethyl)acetanilide

(15) 2-chloro-2',6'-diethyl-N-isobutylamidomethyl)acetanilide

(16) 2-chloro-2',6'-diethyl-N-caprylamidomethyl acetanilide

(17) 2-chloro-2',6'-diethyl-N-(beta-chloropropionamidomethyl)acetanilide

(18) 2-chloro-2',6'-diethyl-N-propionamidomethyl acetanilide

(19) 2-chloro-2',6'-diethyl-N-butyramidomethyl acetanilide

(20) 2-chloro-2',6'-diethyl-N-oxamidomethyl acetanilide

(21) 2-chloro-2',6'-diethyl-N-ureidomethyl acetanilide
(22) 2-chloro-2',6'-diethyl-N-benzamidomethyl acetanilide
(23) 2-chloro-2',6'-diethyl-N-phenylacetamidomethyl)acetanilide
(24) 2-chloro-2',6'-diethyl-N-methacrylamidomethyl)acetanilide
(25) 2-chloro-2',6'-diethyl-N-(3-ethylthiopropionamidomethyl)acetanilide
(26) 2-chloro-2',6'-diethyl-N-lauramidomethyl acetanilide
(27) 2-bromo-2',6'-dimethyl-N-urethylanylmethyl acetanilide
(28) 2-chloro-2'-tert-butyl-N-valeramidomethyl acetanilide
(29) 2-chloro-2'-methyl-6'-ethyl-N-(acetamidomethyl)acetanilide
(30) 2-chloro-2',6'-diethyl-N-(1,2-dichloropropionamidomethyl)acetanilide
(31) 2-chloro-2',6'-diethyl-N-(methacrylamidomethyl)acetanilide
(32) 2-chloro-2'-methyl-6'-tertiary butyl-N-(methacrylamidomethyl)acetanilide
(33) 2-chloro-2'-methoxy-6'-tertiary butyl-N-(methacrylamidomethyl)acetanilide
(34) 2-chloro-2',6'-dimethyl-N-(methacrylamidomethyl)acetanilide
(35) 2-chloro-2',3'-dimethyl-6'-tertiary butyl-N-(acetamidomethyl)acetanilide
(36) 2-bromo-2'-methyl-6'-tertiary butyl-N-(methacrylamidomethyl)acetanilide
(37) 2-chloro-2',6'-diethyl-N-(cyclopropane carboxamidomethyl)acetanilide
(38) 2-chloro-2',6'-diethyl-N-(3-methoxypropionamidomethyl)acetanilide
(39) 2-bromo-2'-ethyl-6'-tertiary butyl-N-(acetamidomethyl)acetanilide
(40) 2-chloro-2',6'-diethyl-N-acetamidoethyl acetanilide
(41) 2-chloro-2',6'-diethyl-N-(2'',6''-dichlorobenzamidoethyl)acetanilide
(42) 2-chloro-2',6'-diethyl-N-allylamidoethyl acetanilide
(43) 2-chloro-2',6'-diethyl-N-formamidoethyl acetanilide
(44) 2-chloro-2',6'-diethyl-N-(3-chloro-2-methylpropionamidoethyl)acetanilide
(45) 2-chloro-2',6'-diethyl-N-acrylamidoethyl acetanilide
(46) 2-chloro-2'-ethyl-6'-methyl-N-(cyclopropane carboxamidoethyl)acetanilide
(47) 2-chloro-2',6'-diethyl-N-(cinnamamidoethyl) acetanilide
(48) 2-chloro-2',6'-diisopropyl-N-(butyramidoethyl)acetanilide.

In order to illustrate the advantages of the present invention, the pre-emergence herbicidal ratings of representative 2-haloacetanilides were determined in greenhouse tests in which a specific number of seeds of a number of different plants, each representing a principal botanical type, were planted in greenhouse flats.

A good grade of top soil was placed in aluminum pans and compacted to a depth of ⅜ to ½ inch from the top of the pan. On the top of the soil was placed a predetermined number of seeds of various plant species. In the surface application the seeds were covered by overfilling the pan with soil and striking it level. The measured amount of chemical in a suitable solvent or as a wettable powder was applied to this surface. In the soil incorporation treatments the soil required to level fill pans after seeding was weighed into a pan, a known amount of the chemical applied in a solvent or as a wettable powder, the soil thoroughly mixed, and used as a cover layer for seeded pans. After treatment the pans were moved into a greenhouse bench where they were watered from below as needed to give adequate moisture for germination and growth.

Approximately 14 days after seeding and treating, the plants were observed and the results recorded. The herbicidal rating was obtained by means of a fixed scale based on the average percent germination of each seed lot. The ratings are defined as follows:

0—No herbicidal activity
1—Slight herbicidal activity
2—Moderate herbicidal activity
3—Severe herbicidal activity.

The pre-emergence herbicidal activity of the alpha-haloacetanilides are recorded in the following table for various application rates in both surface and soil-incorporated applications.

In the table, the letter "M" following the rate of application indicates that the herbicide was incorporated in the soil and the various seeds are represented by letters as follows:

A—Soybean  I—Hemp Sesbania
B—Sugar beet  J—Lamb's-quarters
C—Wheat  K—Velvetleaf
D—Rice  L—*Bromus tectorum*
E—Sorghum  M—Panicum spp.
F—Cocklebur (common)  N—Barnyard grass
G—Wild buckwheat  O—Crabgrass
H—Morning glory

PRE-EMERGENCE HERBICIDAL ACTIVITY

| Compound of Example No. | Rate, lb./a. | A | B | C | D | E | F | G | H | I | J | K | L | M | N | O |
|---|---|---|---|---|---|---|---|---|---|---|---|---|---|---|---|---|
| 2 | 1M | 1 | 0 | 2 | 2 | 3 | 0 | 0 | 0 | 0 | 0 | 1 | 3 | 3 | 3 | 3 |
| 4 | 1 | 0 | 1 | 2 | 0 | 2 | 0 | 1 | 0 | 2 | 0 | 0 | 3 | 2 | 3 | 3 |
| 5 | 1M | 1 | 0 | 3 | 3 | 3 | 0 | 1 | 0 | 1 | 2 | 1 | 3 | 3 | 3 | 3 |
| 6 | 1 | 0 | 0 | 0 | 0 | 0 | 1 | 0 | 0 | 0 | 0 | 0 | 0 | 2 | 3 | 1 |
| 7 | 1 | 0 | 2 | 0 | 2 | 3 | 1 | 0 | 0 | 2 | 1 | 0 | 2 | 3 | 3 | 2 |
| 8 | ¼ | 0 | 0 | 0 | 0 | 3 | 0 | 1 | 1 | 0 | 0 | 0 | 2 | 3 | 3 | 3 |
| 8 | 0.05 | 0 | 0 | 0 | 0 | 0 | 2 | 0 | 1 | 0 | 0 | 0 | 0 | 2 | 3 | 0 |
| 13 | 1 | 0 | 2 | 2 | 3 | 2 | 0 | 0 | 0 | 3 | 2 | 0 | 3 | 3 | 3 | 3 |
| 13 | ¼M | 0 | 0 | 2 | 3 | 2 | 0 | 0 | 0 | 1 | 2 | 0 | 3 | 3 | 3 | 3 |
| 15 | 1 | 0 | 0 | 0 | 1 | 1 | 0 | 0 | 0 | 1 | 0 | 0 | 1 | 2 | 3 | 2 |
| 17 | 1 | 0 | 0 | 0 | 3 | 3 | 0 | 0 | 0 | 1 | 0 | 0 | 3 | 3 | 3 | 3 |
| 18 | 1 | 0 | 3 | 3 | 3 | 3 | 0 | 0 | 1 | 2 | 3 | 0 | 3 | 3 | 3 | 3 |
| 19 | 1 | 1 | 1 | 3 | 2 | 3 | 0 | 1 | 0 | 1 | 2 | 0 | 3 | 3 | 3 | 3 |
| 21 | 1M | 0 | 1 | 0 | 0 | 0 | 0 | 0 | 1 | 0 | 0 | 0 | 0 | 3 | 3 | 3 |
| 29 | 1 | 0 | 2 | 1 | 3 | 3 | 0 | 1 | 0 | 2 | 3 | 0 | 3 | 3 | 3 | 3 |
| 30 | 1 | 0 | 1 | 0 | 2 | 2 | 0 | 0 | 0 | 1 | 2 | 0 | 2 | 3 | 3 | 3 |
| 31 | 1 | 0 | 2 | 0 | 1 | 1 | 0 | 2 | 0 | 0 | 1 | 0 | 2 | 2 | 3 | 3 |
| 31 | ¼ | 0 | 0 | 1 | 1 | 0 | 0 | 0 | 1 | 0 | 0 | 0 | 3 | 3 | 3 | 3 |
| 32 | 1M | 0 | 1 | 0 | 0 | 2 | 0 | 1 | 2 | 1 | 0 | 0 | 2 | 3 | 3 | 3 |
| 33 | 1M | 1 | 0 | 0 | 1 | 0 | 0 | 1 | 0 | 0 | 1 | 0 | 1 | 2 | 3 | 3 |
| 34 | 1M | 1 | 1 | 1 | 1 | 3 | 0 | 2 | 1 | 0 | 1 | 3 | 2 | 3 | 3 | 3 |
| 35 | 1M | 1 | 0 | 0 | 1 | 0 | 0 | 1 | 0 | 0 | 0 | 0 | 1 | 3 | 3 | 2 |
| 36 | 1M | 1 | 1 | 1 | 1 | 3 | 0 | 0 | 2 | 1 | 0 | 0 | 1 | 3 | 3 | 3 |
| 37 | 1M | 0 | 0 | 0 | 2 | 1 | 0 | 1 | 1 | 1 | 0 | 0 | 2 | 3 | 3 | 3 |
| 38 | 1M | 0 | 0 | 1 | 1 | 3 | 0 | 1 | 0 | 1 | 0 | 0 | 3 | 3 | 3 | 3 |
| 38 | ¼ | 0 | 0 | 0 | 0 | 3 | 0 | 0 | 0 | 2 | 1 | 0 | 1 | 3 | 3 | 3 |
| 39 | 1M | 0 | 0 | 0 | 1 | 0 | 0 | 0 | 0 | 0 | 1 | 0 | 1 | 1 | 3 | 3 |
| 39 | ¼ | 0 | 0 | 0 | 0 | 1 | 0 | 0 | 0 | 0 | 0 | 0 | 0 | 1 | 3 | 3 |

The data set forth in the foregoing table clearly illustrates that the compounds of the present invention are effective herbicides and are particularly useful in the control of narrow leaf or grass weeds, even in the presence of grass crops.

The herbicidal compositions of this invention including concentrates which require dilution prior to application contain at least one active ingredient and an adjuvant in liquid or solid form. The compositions are prepared by admixing the active ingredient with an adjuvant including diluents, extenders, carriers and conditioning agents to provide compositions in the form of finely-divided particulate solids, granules, pellets, solutions, dispersions or emulsions. Thus the active ingredient can be used with an adjuvant such as finely divided solid, a liquid of organic origin, water, a wetting agent, a dispersing agent, an emulsifying agent or any suitable combination of these.

The compositions of this invention, particularly liquids and wettable powders, preferably contain as a conditioning agent one or more surface-active agents in amounts sufficient to render a given composition readily dispersible in water or oil. The incorporation of a surface-active agent into the compositions greatly enhances their efficacy. By the term "surface-active agent" it is understood that wetting agents, dispersing agents, suspending agents and emulsifying agents are included therein. Anionic, cationic and non-ionic agents can be used with equal facility.

Preferred wetting agents are alkyl benzene and alkyl naphthalene sulfonates, sulfated fatty alcohols, amines or acid amides, long chain acid esters of sodium isethionate, esters of sodium sulfosuccinate, sulfated or sulfonated fatty acid esters, petroleum sulfonates, sulfonated vegetable oils, ditertiary acetylenic glycols, polyoxyethylene derivatives of alkylphenols (particularly isooctylphenol and nonylphenol) and polyoxyethylene derivatives of the mono-higher fatty acid esters of hexitol anhydrides (e.g. sorbitan). Preferred dispersants are methyl cellulose, polyvinyl alcohol, sodium lignin sulfonates, polymeric alkyl naphthalene sulfonates, sodium napthalene sulfonate, and polymethylene bisnaphthalenesulfonate.

Wettable powders are water-dispersible compositions containing one or more active ingredients, an inert solid extender and one or more wetting and dispersing agents. The inert solid extenders are usually of mineral origin such as the natural clays, diatomaceous earth and synthetic minerals derived from silica and the like. Examples of such extenders include kaolinites, attapulgite clay and synthetic magnesium silicate. The wettable powder compositions of this invention usually contain from about 5 to about 95 parts of active ingredient, from about 0.25 to 25 parts of wetting agent, from about 0.25 to 25 parts of dispersant and from 4.5 to about 94.5 parts of inert solid extender, all parts being by weight of the total composition. Where required, from about 0.1 to 2.0 parts of the solid inert extender can be replaced by a corrosion inhibitor or anti-foaming agent or both.

Aqueous suspensions can be prepared by mixing together and grinding an aqueous slurry of water-insoluble active ingredient in the presence of dispersing agents to obtain a concentrated slurry of very finely-divided particles. The resulting concentrated aqueous suspension is characterized by its extremely small particle size, so that when diluted and sprayed, coverage is very uniform.

Emulsifiable oils are usually solutions of active ingredient in water-immiscible or partially water-immiscible solvents together with a surface active agent. Suitable solvents for the active ingredient of this invention include hydrocarbons and water-immiscible ethers, esters or ketones. The emulsifiable oil compositions generally contain from about 5 to 95 parts active ingredient, about 1 to 50 parts surface active agent and about 4 to 94 parts solvent, all parts being by weight based on the total weight of emulsifiable oil.

Granules are physically stable particulate compositions comprising active ingredient adhering to or distributed through a basic matrix of an inert, finely-divided particulate extender. In order to aid leaching of the active ingredient from the particulate, a surface active agent such as those listed hereinbefore can be present in the composition. Natural clays, pyrophyllites, illite and vermiculite are examples of operable classes of particulate mineral extenders. The preferred extenders are the porous, absorptive, performed particles such as performed and screened particulate attapulgite or heat expanded, particulate vermiculite, and the finely-divided clays such as kaolin clays, hydrated attapulgite or bentonitic clays. These extenders are sprayed or blended with the active ingredient to form the herbicidal granules.

The granular compositions of this invention generally contain from about 5 parts to about 30 parts by weight of active ingredient per 100 parts by weight of clay and 0 to about 5 parts by weight of surface active agent per 100 parts by weight of particulate clay. The preferred granular compositions contain from about 10 parts to about 25 parts by weight of active ingredient per 100 parts by weight of clay.

The compositions of this invention can also contain other additaments, for example fertilizers, herbicides, other pesticides and the like used as adjuvants or in combination with any of the above-described adjuvants. Chemicals useful in combination with the active ingredients of this invention include for example triazines, ureas, carbamates, acetamides, acetanilides, uracils, acetic acids, phenols, thiolcarbamates, triazoles, benzoic acids, nitriles and the like such as:

3-amino-2,5-dichlorobenzoic acid
3-amino-1,2,4-triazole
2-methoxy-4-ethylamino-6-isopropylamino-$s$-triazine
2-chloro-4-ethylamino-6-isopropylamino-$s$-triazine
2-chloro-N,N-diallylacetamide
2-chloroallyl diethyldithiocarbamate
N'-(4-chlorophenoxy) phenyl-N,N-dimethylurea
1,1'-dimethyl-4,4'-bipyridinium dichloride
isopropyl N-(3-chlorophenyl)carbamate
2,2-dichloropropionic acid
$S$-2,3-dichloroallyl N,N-diisopropylthiolcarbamate
2-methoxy-3,6-dichlorobenzoic acid
2,6-dichlorobenzonitrile
N,N-dimethyl-2,2-diphenylacetamide
6,7-dihydrodipyrido(1,2-a:2',1'-c)-pyrazidiinium salt
3-(3,4-dichlorophenyl)-1,1-dimethylurea
4,6-dinitro-$o$-$sec$-butylphenol
2-methyl-4,6-dinitrophenol
ethyl N,N-dipropylthiolcarbamate
2,3,6-trichlorophenylacetic acid
5-bromo-3-isopropyl-6-methyluracil
3-(3,4-dichlorophenyl)-1-methoxy-1-methylurea
2-methyl-4-chlorophenoxyacetic acid
3-($p$-chlorophenyl)-1,1-dimethylurea
1-butyl-3-(3,4-dichlorophenyl)-1-methylurea
N-1-naphthylphthalamic acid
1,1'-dimethyl-4,4'-bipyridinium salt
2-chloro-4,6-bis(isopropylamino)-$s$-triazine
2-chloro-4,6-bis(ethylamino)-$s$-triazine
2,4-dichlorophenyl-4-nitrophenyl ether
alpha, alpha, alpha-trifluoro-2,6-dinitro-N,N-dipropyl-$p$-toluidine
$S$-propyl dipropylthiolcarbamate
2,4-dichlorophenoxyacetic acid
N-isopropyl-2-chloroacetanilide
2',6'-diethyl-N-methoxymethyl-2-chloroacetanilide
monosodium acid methanearsonate
disodium methanecarsonate
N-(1,1-dimethylpropynyl)-3,5-dichlorobenzamide.

Fertilizers useful in combination with the active ingredients include for example ammonium nitrate, urea, potash, and superphosphate. Other useful additaments include materials in which plant organisms take root and grow such as compost, manure, humus, sand and the like.

When operating in accordance with the present invention, effective amounts of the acetanilides are applied to the plants, or to soil containing the plants, or are incorporated into aquatic media in any convenient fashion. The application of liquid and particulate solid compositions to plants or soil can be carried out by conventional methods, e.g. power dusters, boom and hand sprayers and spray dusters. The compositions can also be applied from airplanes as a dust or a spray because of their effectiveness at low dosages. The application of herbicidal compositions to aquatic plants is usually carried out by adding the compositions to the aquatic media in the area where control of the aquatic plants is desired.

The application of an effective amount of the compounds of this invention to the plant is essential and critical for the practice of the present invention. The exact amount of active ingredient to be employed is dependent upon various factors, including the plant species and stage of development thereof, the type and condition of soil, the amount of rainfall and the specific acetanilide employed. In non-selective pre-emergence treatments, the compounds of this invention are usually applied at an approximate rate of from 1 to 25 pounds per acre. In selective pre-emergence application to the plants or to the soil containing a dosage of from 0.05 to about 5 pounds of acetanilide per acre is usually employed. Lower or higher rates may be required in some instances. One skilled in the art can readily determine from this specification, including the examples, the optimum rate to be applied in any particular case.

The term "soil" is employed in its broadest sense to be inclusive of all conventional "soils" as defined in Webster's New International Dictionary, Second Edition, Unabridged (1961). Thus the term refers to any substance or media in which vegetation may take root and grow, and includes not only earth but also compost, manure, muck, humus, sand and the like, adapted to support plant growth.

Although the invention is described with respect to specific modifications, the details thereof are not to be construed as limitations except to the extent indicated in the following claims.

What is claimed is:

1. A compound of the formula

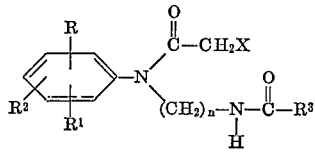

wherein:

R and $R^1$ are selected from the group consisting of hydrogen, alkyl and alkoxy having at least 1 and not more than 10 carbon atoms;

$R_2$ is selected from the group consisting of hydrogen, alkyl and alkoxy having at least 1 and not more than 10 carbon atoms, $NO_2$ and halogen;

$R^3$ is selected from the group consisting of hydrogen, alkyl, alkenyl, alkoxyalkyl, alkylthioalkyl, haloalkyl, each having a maximum of 18 carbon atoms; cycloalkyl having a maximum of 6 carbon atoms, phenyl, dichlorophenyl, tolyl, naphthyl, benzyl, cinnamyl, phenoxy and amine;

X is chlorine, bromine or iodine; and $n$ is an integer of 1 or 2.

2. A compound of Claim 1 wherein R and $R^1$ are alkyl and are in the 2 and 6 positions.

3. A compound of Claim 2 wherein R and $R^1$ are ethyl.

4. A compound of Claim 3 wherein $R^3$ is alkyl.

5. A compound of Claim 1 wherein $n$ is 1.

6. A compound of Claim 2 which is 2 - chloro-2',6'-diethyl - N - acetamidomethyl acetanilide.

7. A compound of Claim 2 which is 2-chloro-2',6'-diethyl-N-(cyclopropane carboxamidomethyl) - acetanilide.

8. A compound of Claim 2 which is 2 - chloro - 2'-methyl-6'-ethyl - N - (acetamidomethyl) - acetanilide.

9. A compound of Claim 2 which is 2-chloro-2',6'-diethyl - N - (beta-chloropropionamidomethyl)-acetanilide.

References Cited

UNITED STATES PATENTS

| | | | |
|---|---|---|---|
| 2,719,176 | 9/1955 | Coover et al. | 260—561 |
| 2,628,217 | 2/1953 | Magat | 260—561 |
| 2,518,156 | 8/1950 | Magat | 260—561 |

OTHER REFERENCES

Krimen et al.: Organic Reactions, vol. 17, pp. 213–35 (1969).

HARRY I. MOATZ, Primary Examiner

U.S. Cl. X.R.

71—98, 118, 120, 107; 260—471 C, 553 A, 558 D, 562 B